US009426101B2

(12) United States Patent
Zhou et al.

(10) Patent No.: US 9,426,101 B2
(45) Date of Patent: Aug. 23, 2016

(54) SYSTEMS AND METHODS OF AUTOMATICALLY ORDERING AND SELECTING RECIPIENTS FOR ELECTRONIC MAIL

(71) Applicant: Microsoft Corporation, Redmond, WA (US)

(72) Inventors: Long Zhou, Redmond, WA (US); John Morrow, Seattle, WA (US); Taylor Lehman, Seattle, WA (US); Shrivaths Iyengar, Redmond, WA (US); Vincent Celie, Seattle, WA (US); Michael Farnsworth, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/754,494

(22) Filed: Jan. 30, 2013

(65) Prior Publication Data
US 2014/0214976 A1      Jul. 31, 2014

(51) Int. Cl.
*H04L 12/58* (2006.01)

(52) U.S. Cl.
CPC ............... *H04L 51/02* (2013.01); *H04L 51/28* (2013.01); *H04L 51/22* (2013.01)

(58) Field of Classification Search
CPC ............ H04L 29/06408; H04L 41/026; H04L 65/4023; H04L 69/00; H04L 51/02; H04L 51/22; H04L 51/26; H04L 51/28
See application file for complete search history.

(56) References Cited

U.S. PATENT DOCUMENTS

| 7,716,217 | B2 | 5/2010 | Marston |
| 8,122,025 | B2 | 2/2012 | Ando |
| 8,301,707 | B1 * | 10/2012 | Hebb et al. .................... 709/206 |
| 8,307,038 | B2 | 11/2012 | Gillum |
| 8,316,100 | B2 | 11/2012 | Essenmacher |
| 8,738,634 | B1 * | 5/2014 | Roth et al. .................... 707/748 |
| 2007/0288575 | A1 * | 12/2007 | Gillum et al. ................. 709/206 |

(Continued)

OTHER PUBLICATIONS

"International Search Report & Written Opinion for PCT Patent Application No. PCT/US2014/013092", Mailed Date: May 23, 2014, Filed Date: Jan. 27, 2014, 12 pages.

(Continued)

*Primary Examiner* — Nicholas Taylor
*Assistant Examiner* — Afroza Sultana
(74) *Attorney, Agent, or Firm* — Damon Rieth; Tom Wong; Micky Minhas

(57) ABSTRACT

Systems and techniques of providing suggestions for email recipients to a user who is composing an email communications are disclosed herein. In one embodiment, a user may register a plurality of email accounts with an email application. Once an email account is registered with the email application, contact data from each such registered email account may be received. In another embodiment, if the user employs a plurality of devices from which the user composes and/or sends email communications, device-specific contact information may also be received. Relevance metrics may be applied to such suggestions depending upon the contact data received from the various email accounts. Dynamic correction factor may be applied to such relevance metrics—e.g., a decay factor, decrement factor or the like that may or may not be time dependent.

19 Claims, 4 Drawing Sheets

(56) References Cited

U.S. PATENT DOCUMENTS

| | | | | |
|---|---|---|---|---|
| 2008/0071873 | A1* | 3/2008 | Gross | 709/206 |
| 2008/0235242 | A1* | 9/2008 | Swanburg et al. | 707/10 |
| 2010/0174912 | A1 | 7/2010 | West et al. | |
| 2011/0106880 | A1* | 5/2011 | Strong et al. | 709/203 |
| 2012/0260188 | A1* | 10/2012 | Park et al. | 715/739 |
| 2013/0080546 | A1* | 3/2013 | Souza et al. | 709/206 |
| 2014/0004837 | A1* | 1/2014 | Varoglu et al. | 455/414.3 |

OTHER PUBLICATIONS

Automatically add contacts for everyone that you send an email message—Retrieved Date: Jan. 9, 2013 Proceedings: NA Author: NA Pages NA http://office.microsoft.com/en-in/outlook-help/automatically-add-contacts-for-everyone-that-you-send-an-email-.

Reset the Auto-completion Email Address Name List used by Outlook to auto-complete addressing in the To, CC and BCC Lines—Retrieved Date: Jan. 9, 2013 Proceedings: NA Author: NA Pages.

* cited by examiner

*FIG.4*

| | Account | Score |
|---|---|---|
| a@domain.com | me@work.com | 2 |
| b@domain.com | me@work.com | 5 |
| a@domain.com | me@home.com | 1 |
| d@domain.com | me@home.com | 6 |

*FIG.5*

| | a@domain.com | b@domain.com | c@domain.com | d@domain.com |
|---|---|---|---|---|
| a@domain.com | ■ | 2 | 3 | 2 |
| b@domain.com | 2 | ■ | 1 | 6 |
| a@domain.com | 3 | 1 | ■ | 4 |
| d@domain.com | 2 | 6 | 4 | ■ |

*FIG.6*

To:
[Person A]

☐ Person C
c@domain.com

☐ Person B
b@domain.com

☐ Person D
d@domain.com

SYSTEMS AND METHODS OF AUTOMATICALLY ORDERING AND SELECTING RECIPIENTS FOR ELECTRONIC MAIL

BACKGROUND

In the area of electronic mail, it is known that certain electronic mail applications may make a list of suggested recipients when the user is drafting an email communication. The suggestions typically come after a certain amount of information is placed within given fields of the email.

For example, in some email systems, it is possible that—as the user types a possible recipient's name, the email system may provide "suggestions"—i.e. a list of potential recipients that the user might by considering. If the intended recipient is on such a list, the user may be able to select that given recipient with a single gesture (e.g., mouse click, key stroke or the like) and the recipient's name is inserted into the TO, CC or BCC filed without further typing.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and techniques of providing suggestions for email recipients to a user who is composing an email communications are disclosed herein. In one embodiment, a user may register a plurality of email accounts with an email application. Once an email account is registered with the email application, contact data from each such registered email account may be received. In another embodiment, if the user employs a plurality of devices from which the user composes and/or sends email communications, device-specific contact information may also be received. Relevance metrics may be applied to such suggestions depending upon the contact data received from the various email accounts. Dynamic correction factor may be applied to such relevance metrics—e.g., a decay factor, decrement factor or the like that may or may not be time dependent.

In one embodiment, a method for automatically providing suggestions for email recipients to a user composing an email communication is disclosed. The method may comprise the steps of: registering said plurality of email accounts; for at least two said email account registered, receiving contact data from each said email account; and when user is composing an email communication, making suggestions for additional email recipients based upon a relevance metric, said relevance metric derived from contact data from said at least two said email accounts.

In another embodiment, a method for dynamically correcting a relevance metric for a given email contact is disclosed. The step of this method may comprise: applying a time-dependent dynamic correction to said relevance metric to a given email contact, such that said time-dependent dynamic correction weakens the relevance metric for said given email contact over time.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4 and 5 are exemplary embodiments of a relevancy table that associates email recipients according to certain metadata.

FIG. 6 depicts one exemplary screenshot depicting the operation of an electronic mail application as made in accordance with the principles of the present application.

DETAILED DESCRIPTION

Figure 1:
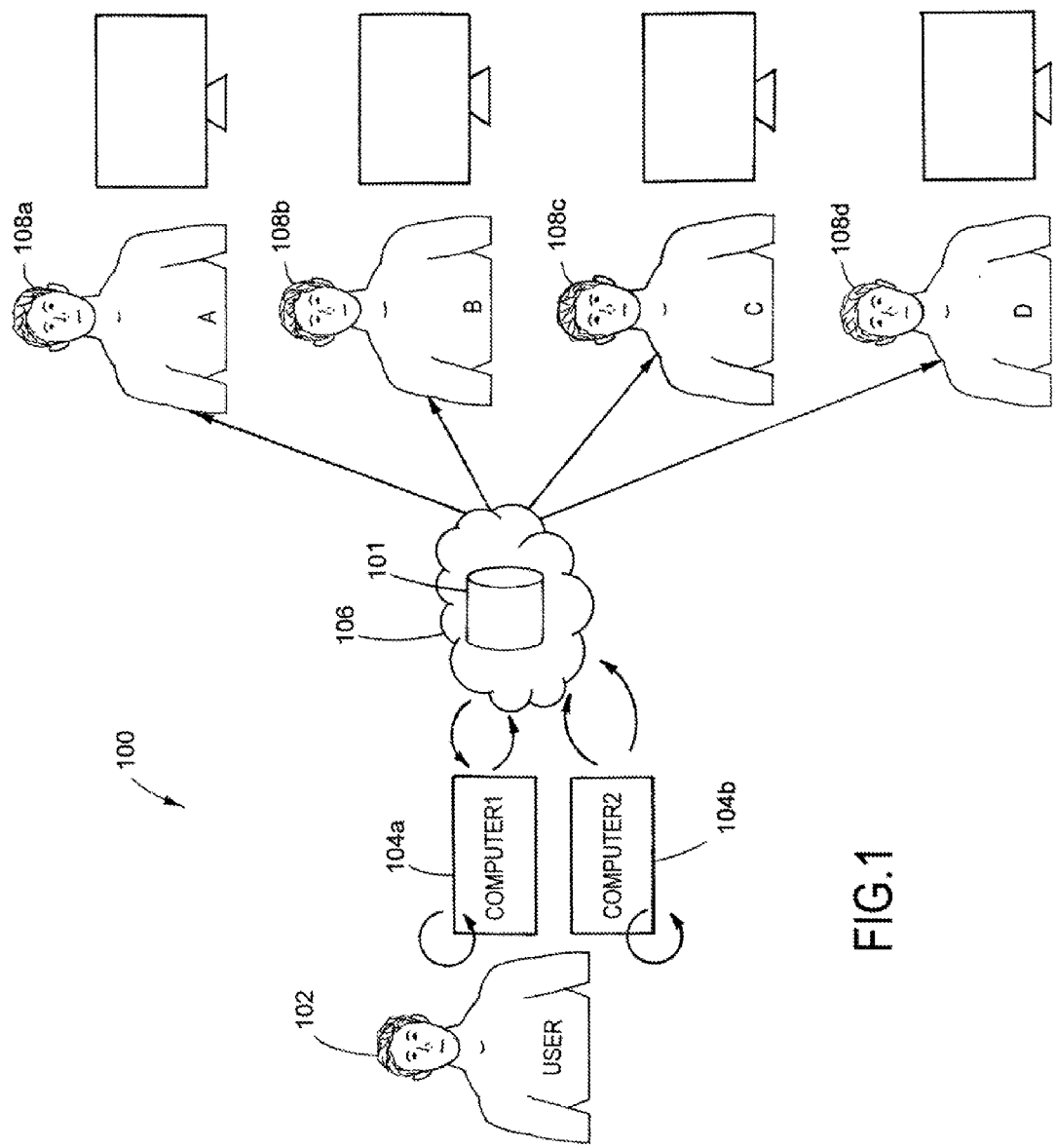
FIG. 1 depicts one embodiment of the environment in which electronic mail systems and methods as made in accordance with the principles of the present application may operate.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

The reality of modern electronic communications is that most people access their electronic mail from a variety of sources. People often maintain multiple email accounts from various providers (e.g., from Google, AOL, Microsoft and the like). These accounts from third-party providers are usually in addition to a user's work email account. Users have become accustomed to having multiple email accounts open at any given time and switch between several of these accounts. In addition, users may have multiple physical devices that they access electronic mail. For example, it is not unusual for a person to have their work desktop/laptop open—while having their smart phone, laptop, tablet open at the same time.

While some electronic mail providers are now giving their users "suggestions" to help them formulate emails (e.g., suggesting possible other email recipients to add to the TO, CC or BCC line of the email), these suggestions do not address the complexity and multiplicity of multiple email accounts, multiple physical devices and the myriad ways that people are interacting with the general concept of "electronic communication".

FIG. 1 depicts one exemplary embodiment of a modern electronic communications environment (100). User 102 may have in his/her vicinity one or more computers/smart devices or the like (104*a*, 104*b*). Each of these devices may have multiple email accounts open and active. For example, device 104*a* may have a work email account open and one or more third-party email account open. Device 104*b* may have other email accounts open and active. Each of these devices may connect to communications 106 (e.g., Internet, wireless networks, wired networks or the like). User 102 may be in synchronous or asynchronous electronic communication with other users—e.g., users 108*a*, 108*b*, 108*c* and 108*d*.

One Embodiment

The present email application may be affected as an application that may be accessed as a client application residing at a server and/or processor 101 remotely—or may be downloaded from the internet, possibly from server/processor 101. Server/processor 101 itself may comprise a processor, electronic memory (e.g., RAM, ROM, flash and/or any known electronic storage media), communications module suitable to connect with one or more users of the email application. In addition, server/processor 101 may have software, firmware and/or any suitable computer-readable instructions sufficient to affect the email application described herein.

In one embodiment, the present email application may reside on the user's various devices, or on the internet, or elsewhere where client applications may reside and/or execute. It is possible that instances of the email application that may be executing on a plurality of user's devices may communicate with each other directly or indirectly via a service on the internet or as a service provided by cloud computing. However the email application is affected, it may be sufficient for purposes of this present application that the email application is in communication with the user's various email accounts and/or the user's various devices from which the user may access the various email accounts.

Initially, user 102 may enter some form of credential and/or password to launch the email application (e.g., from device 104*a*). The user may register any and/or all email accounts associated with the user. For each said email account registered (or any desired subset of such email accounts, including possible two or more accounts), various contact data and/or metadata may be received by the email application. Such contact data may comprise: contact name, contact addresses, data regarding the number of emails sent to particular contacts and association data by and between various contacts (e.g., how often two or more contacts were placed together on any given email communication, or the like), data regarding from which device the user has sent emails (e.g., how often contacts and subsets of contacts are sent from any desired device and the association data by and between contacts that is device-specific). From such device-specific contact data, it may be possible to make suggestions that are device-specific, as the user composes email communications on any given device which may be registered and/or for which contact data may be received.

As the user composes an email communication, the email application may make suggestions for additional email recipients, wherein the suggestions may be based on a desired relevance metric. As discussed here and further herein, a suitable relevance metric may comprise: relevance scores for any given contact (e.g., the number of times a given contact is emailed), association data and/or metrics (e.g., how many times a given contact is included in an email, given the previous email recipients selected by the user). As discussed further herein, there are many embodiments of a suitable relevance metric—e.g., a score, value or the like. In addition, the relevance metric may have a dynamic correction and/or component. Such dynamic correction may comprise a temporal relationship. For example, such a temporal relationship and/or time dependency may involve a decay factor, decrement factor or the like over time.

For one embodiment, the email application may sync with any email account that is registered with the email application. The email application may look at the previously sent emails to update its database and relevance scores, as mentioned further herein. As user 102 may send out email to various people (e.g. 108*a*-*d*), the email application may sync those new emails and update the database and relevance scores as well.

When the email application is registered and/or installed on another device (e.g., 104*b*), then the email application may sync all of the email from that new device. The email application may then update its database and recalculate relevance scores. In one aspect, the email application may also "roam" (e.g., share, upload and/or populate) the relevant data between devices and/or from device to device. In another aspect, it may be possible for the email application to periodically run a task to update all of the relevance scores. In yet another aspect, after initial setup, the email application may be updating relevance scores in real time or substantially real time—e.g., as the user uses the email application and sends email while the email application is actively running.

In some embodiments, the email application may scan emails that the user may have sent on other devices—both current emails and those sent previously. This may tend to improve the relevance scores and the relevancy of the suggestions to the user. In addition, the email application may vary the suggestions depending on what account the user is sending the email from.

In another embodiment, if the user buys or otherwise obtains a new device that either has an executable that accesses the email application or otherwise enables the email application, then the email application may work with the activity on the user's new device. For example, if the user opens up an existing email account, then the user's activity on that account may be sync'd or otherwise downloaded to the email application.

For example, if the user has a work email and a home email, then the email application may make suggestions specific to any given account. Thus, in one embodiment, it is possible to employ email account-specific contact data to make suggestions that are specific to the email account from which the user is composing an email communication. In addition to email account-specific contact data, it may be possible to make suggestions that are specific to given device that the user is composing email communications. In this way, it may be possible to make and/or offer suggestions that have a component of email account-specific and device-specific contact data at the time the user is composing an email communication.

In some embodiments, the email application may make suggestions depending on the people who have already been added to the TO: line. For example, if the user adds person A to the TO: line, and the user often emails person B and C when the user emails person A, then the email application may suggest B and C to add to the email. As will be discussed herein, the email application may record who the user emails and update a database to reflect that data. For one example, the email application may create an adjacency matrix for your email relationships. The email application may then use that calculate the best person (or persons) to suggest.

One Set-Up Embodiment

Figure 2:
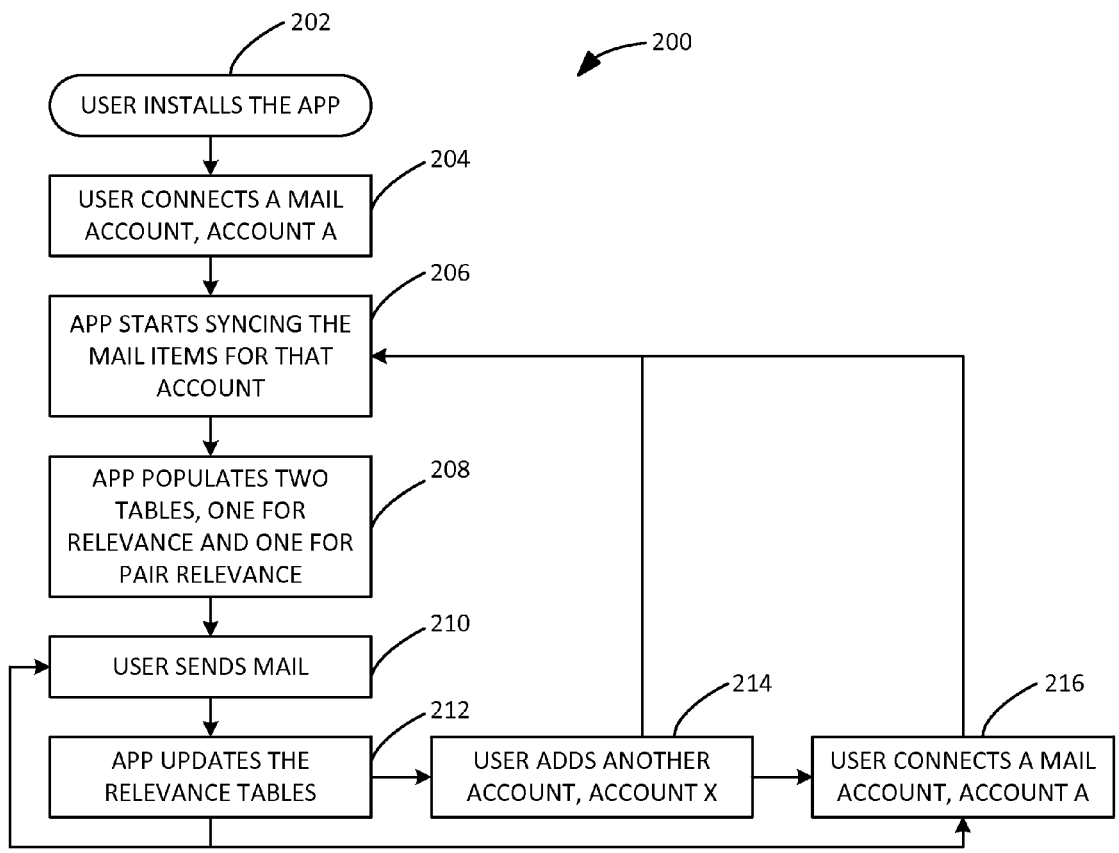
FIG. 2 is one embodiment of a flowchart of setting up an electronic mail application as made in accordance with the principles of the present application.

FIG. 2 is one embodiment for setting up the email application of the present application. Set Up 200 may proceed at step 202 by the user either installing—or otherwise initiating—the email application. The user may initiate the email application in a multitude of ways, such as: initiating the email application remotely (e.g., on the internet or other remote means) or starting the application on user's device. It will be appreciated that other manners of initiating the email application may be possible.

At step 204, the user may connect and/or register an email account of the user with the email application (for example, email account "A"). At step 206, the email application may sync the email items for that account and, at step 208, may start to populate one or more tables (or other suitable data structure). In one embodiment, one data structure may be a "relevance" relationship and another data structure may be a "pair relevance" relationship, as will be discussed further herein.

At step 210, the user may send out an email from a registered email account. At step 212, the application may thereafter update the respective relevance relationships data structures. Over time, the user may add another email account (e.g., account "X") at step 214. At that point, the email application may start syncing the email items for account "X" back at step 206 and process similarly as for account A.

At step 216, the email application may connect (or re-connect) account A to the email application and start the processing over again at 206. In addition, the information extracted from account X may be roamed over to account A, and vice versa. The email application may thus continue processing registered email accounts indefinitely (or at least until an email account is exited, or unregistered from the email application). As the processing logic may be substantially the same for each email account, it is possible to roam the data by and between email accounts—and by and between devices on which the email accounts are running. In one embodiment, it may be possible for the email application to keep the relevancy data for each email account separate from each other email account.

One Runtime Embodiment

Figure 3:
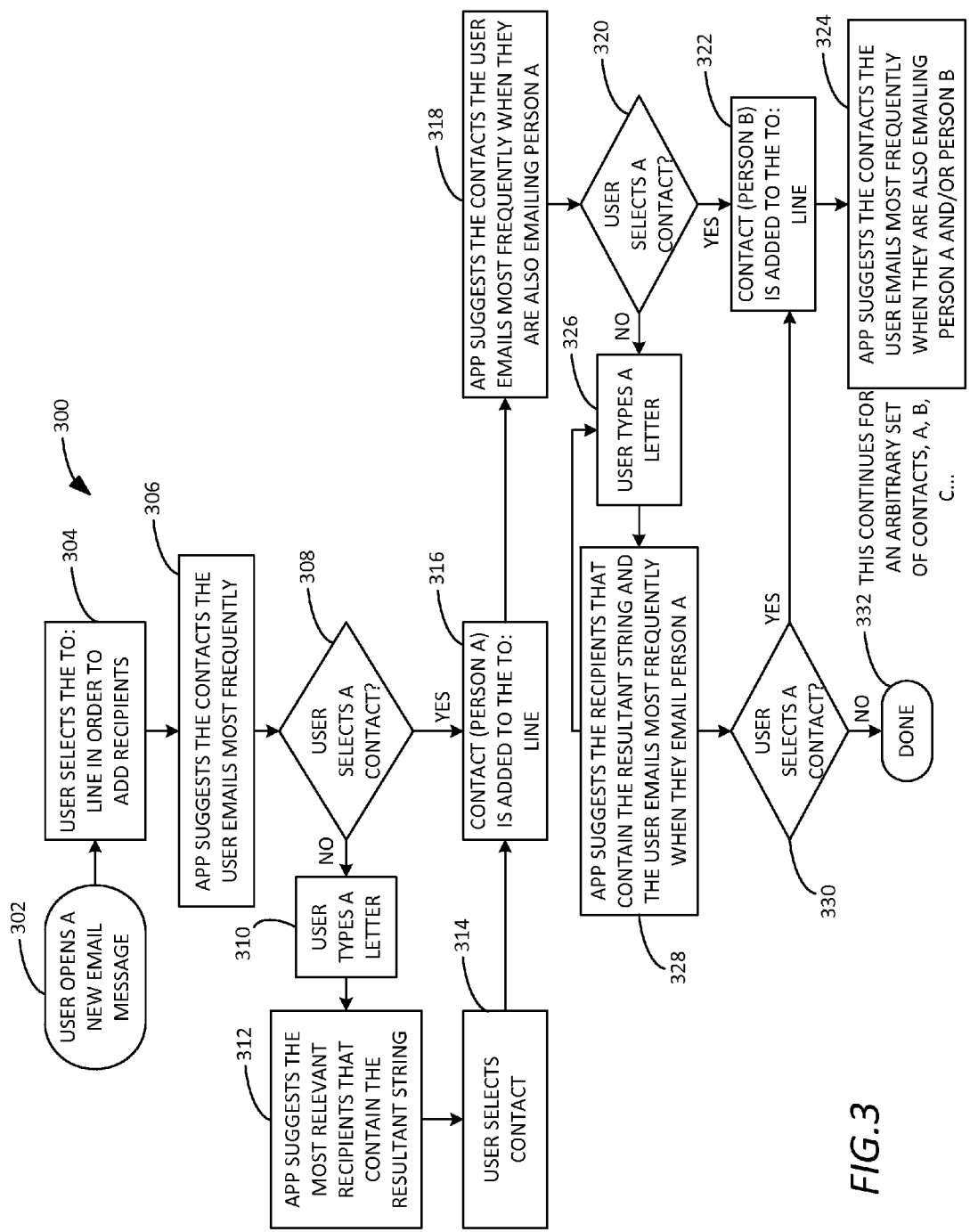
FIG. 3 is one embodiment of a flowchart of the operation of an electronic mail application as made in accordance with the principles of the present application.

FIG. 3 is one embodiment of the email application during a runtime operation. During the course of the runtime, the email application may make suggestions, update data and take other possible actions. At step 302, the user may open up an email message to compose a new email. If the email application is running and the email account is registered with the email application, then the email application may be aware of the user's action to create a new email message.

At 304, the user may select the TO: line, CC: line, and/or BCC: line in order to add possible recipients. At 306, the email application may suggest contacts that the user emails the most. In one embodiment, the email application may make the suggestion based on the particular email account that the user is currently accessing. For example, if the user is using work email, then the email application may make the initial suggestion from the most frequently emailed contact from that work email account. Other email accounts may have a separate suggestion list.

At 308, the user may opt to select one of the choices offered by the email application. If not, then the user may start by typing a letter (e.g., first name, last name and/or separate indicia of identity). At 312, the email application may suggest the most relevant recipients that contain the typed string. In one embodiment, the most relevant recipients may be presented as a list—with the list ordering from highest to lowest relevance. In addition, all contacts may be so listed. Alternatively, there may be a maximum number of such relevant contacts listed—or, the number listed be a function of the relevance score (e.g., all contacts listed having a relevance over a threshold score or the like). At 314, the user may select one of the suggested contacts—or, the user may ignore the suggestions and finish typing the email address intended. If the user types an entire email address (i.e., not from the suggestion list), then that information may be updated in the data structures associated with the email application.

In any event, that contact (e.g. Person A) is added to the appropriate line (TO, CC, BCC) at 316. At that point, the email application may suggest other contacts that are most frequently associated with that contact (e.g., Person A) at 318. At 320, the user may select another contact so suggested by the email application. If so, that contact (e.g., Person B) may be added to the appropriate line at 322. At 324, the email application may then make suggestions for other contacts who are most associated with previous contacts (e.g., Persons A and B). It will be appreciated that the email application may make these suggestions from data culled from and across the several email accounts and/or devices that are registered with the email application.

If at 320, the user does not select a contact, then as the user types a contact at 326, the application may suggest recipients at 328, as similarly discussed for 318. At 330, the user may select a contact—and processing may proceed as at 322. Or the user may finish typing out the contact (and processing may end at 322). It will be appreciated that this processing may continue as long as an additional contact is desired by the user and the user makes gestures (e.g., mouse clicks within address lines, typing strings in address lines or the like).

Relevance Embodiments

In the embodiments mentioned herein, it is desirable to affect a relevance score for making effective suggestions. In one embodiment, the email application may affect relevance recording and/or pre-calculations.

For example, when a user adds an email account, the email application may sync the previously sent emails and record who the user emailed in a table (or any other suitable data structure), with each email address and a score for how relevant they are. When the user sends an email, the email application may increment this score.

For merely one example, FIG. 4 shows a table 400 wherein email contacts (e.g., a@domain.com etc.) may be listed and associated with one or many of the user's email accounts (e.g., me@work.com or me@home.com or the like). As this contact is selected for emails, the "score" associated with this contact may be incremented. In this embodiment, a higher score may mean a more "relevant" contact. In one embodiment, this relevance score may also be associated with a plurality of email accounts—and not just with one given email account. In that case, a contact that occurs as a contact in multiple email accounts tends to signify a high degree of relevance to the user.

In addition to such relevance relationship and scoring for one given contact versus one or more email accounts, it is possible to create "pair relevance". That is, contacts may be correlated against each other—across one or more email accounts that may be registered with the email application.

For example, FIG. 5 depicts one possible embodiment of pair relevance. Table 500 may be a separate table representing this "pair relevance". Table 500 reflects which email addresses/contacts were on a same email message. This keeps track of how often your emailed specific email addresses together. For example, as may be seen, for a contact such as a@domain.com, it appears that c@domain.com is most frequently paired by the user. As with other relevance metrics, this pairing relevance may be correlated across multiple email accounts and/or devices associated with the user.

Use of Relevance Metrics and/or Scores

As the user sends emails, and as the email application syncs Sent emails from other devices, the email application may record this information in the relevance data structures.

For one embodiment, the email application may query for suggestions. For example, when the user creates a new email, the email application may query the relevance table (e.g. FIG. 4) for the most relevant suggestions, and display them. When the email application does this, it is possible for the email application to select the relevance entries that correspond to the "from" email account the user has currently selected.

In addition, as the user adds email addresses to the TO: line (or other address lines), it is possible for the email application to query the pair relevance table (e.g., FIG. 5) for the most relevant people corresponding to the added addresses. For example, in FIG. 6, if the user added a@domain.com to the TO: line (602), the email application may then suggest c,b,d in that order (604, 606, and 608 respectively). If the user then added c, the email application may suggest d,b in that order because d is the most relevant to a and c. In one embodiment, it is possible that, as the user adds recipients to the message, the user will obtain suggestions relevant to those recipients from the email application.

Updating Relevance Values

In some embodiments, it is possible to alter the relevance scores (e.g., via a dynamic correction), possibly on a temporal basis. For merely one example, every day (or any other desired time period), the email application may apply a decay factor to the relevance scores—e.g., for merely one example, by a factor of 0.91 per a given time period (e.g., day, week, etc.). This decay factor tends to correspond to a factor of ½ per week, if the given time period is a day. In this example, this adjustment means sending someone 1 email today makes them as relevant as if the user had sent them 2 emails a week ago—thereby, weakening the relevance of a given email contact over time.

In such embodiments, the email application may apply a plurality of dynamic corrections over time—e.g., applying different decay factors for different time periods. For example, the decay factor may be greater in an earlier time period—and the decay factor may itself decrease thereafter, in order to ensure that the contact maintains some relevance for a longer period of time. Alternatively, the decay may be cut-off after a desired period of time—e.g., to keep the contact as relevant, or to delete (and/or remove) the contact from the relevance list entirely.

In another embodiment, the relevance score could be affected by decrementing the relevance score—as opposed to applying a decay factor. In such a case, for example, a contact having a relevance score of 6 might be decremented by 1 after a desired time has expired. For merely one example, the email application may decrement the relevance scores by 1 every week, every few days (or a desired). As with the decay factor above, different decrements may be applied over different time periods. In addition, decrement may go to zero (i.e., the contact is removed from the relevance list) or stops at a non-zero number.

In both the decay and decrement embodiments above, it may be desirable to have a negative relevance score for a variety of reasons. For example, if the user has a strong preference that a particular contact not (or never) receive an email regarding a particular subject, then the user may instruct the email application to place that particular contact on a "blocked" list. The user may provide the email application with subject matter (e.g., keywords or semantic clues or the like) that would associate the email as being "blocked" to the particular contact. The email application may then perform some analysis (e.g., keyword search, semantic analysis or the like) as an email is being written (e.g., in the Subject heading or in the body of the email text)—in order to determine whether the particular email being written by the user should not be sent to the contact.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for automatically providing suggestions for email recipients to a user composing an email, the user having a plurality of email accounts, and each of the email accounts further contain a plurality of contacts; the method comprising:

receiving user registration of the plurality of email accounts;

for at least two of the plurality of email accounts that are registered, receiving contact data from each of the at least two registered email accounts, the contact data containing frequencies of communications between the user and the individual contacts;

when the user is composing an email, determining which one of the registered email accounts is to be used to send the composed email;

deriving suggestions of additional email recipients for the email being composed based on (i) the determined one of the registered email accounts to be used to send the composed email and (ii) the frequencies of communications between the user and the individual contact contained in the received contact data obtained from across all of the at least two of the plurality of email accounts; and providing the derived suggestions of additional email recipients for selection by the user;

for each new email sent by the user, receiving new contact data derived from the sent new email; and updating a mapping of each of the plurality of contacts with respective scores to reflect the contact data from the new email.

2. The method of claim 1, further comprising:

receiving a first subset of the contact data from a first device that the user uses to compose the email;

receiving a second subset of the contact data from a second device, the received second subset being different than the received first subset of the contact data.

3. The method of claim 2 wherein the method further comprises:

when user is composing the email,
 determining whether the first or second device is being used to send the composed email; and
 wherein deriving suggestions of the additional email recipients includes deriving suggestions of the additional email recipients for the email being composed based on (i) the determined one of the registered email accounts to be used to send the composed email and (ii) the frequencies of communications between the user and the individual contact contained in the received contact data obtained from across all of the at least two of the plurality of email accounts; and (iii) the determination of whether the first or second device is being used to send the composed email.

4. The method of claim 2 wherein the method further comprises:

determining that the user may uses the second device to compose and send another email; and sharing first subset of the contact data between the first device and the second device.

5. The method of claim 1 wherein:

the new contact data derived from the new email is dependent upon which one of the first or second device the user used to send the new email.

6. The method of claim 5 wherein:

the new contact data derived from the new email is dependent upon which one of the at least two email accounts the user used to send the new email.

7. The method of claim 6 wherein:

the at least two email accounts include a first email account and a second email account;

when the user is composing the email, deriving first suggestions of additional email recipients for the email being composed based on (i) a determination that the first email account is to be used to send the composed email and (ii) the frequencies of communications between the user and the individual contact contained in the received contact data obtained from across all of the at least two of the plurality of email accounts;

when the user is composing another email, deriving second suggestions of additional email recipients for the email being composed based on (i) a determination that the second email account is to be used to send the composed email and (ii) the frequencies of communications between the user and the individual contact contained in the received contact data obtained from across all of the at least two of the plurality of email accounts; and the derived first suggestions are different than the derived second suggestions.

8. The method of claim 1 wherein the method further comprises:

applying a dynamic correction to the respective frequencies of communications of the plurality of contacts.

9. The method of claim 8 wherein applying the dynamic correction to the respective scores of the plurality of contacts further comprises:

applying a time decay factor to the respective scores of plurality of contacts.

10. The method of claim 8 wherein applying the dynamic correction to the respective scores further comprises:

applying a time-dependent decrement factor to the respective scores of the plurality of contacts.

11. The method of claim 8 wherein applying the dynamic correction to the respective scores further comprises:

applying a plurality of dynamic corrections to the respective scores over time.

12. The method of claim 1, further comprising:

applying a negative score to the contact data, the negative score being capable of weakening the association between a first contact and a second contact of the plurality of contacts.

13. The method of claim 12, further comprising:

receiving a negative score supplied by the user, wherein the negative score associates email subject matter with a desired contact; and upon a user composing another email, applying analysis to the email to determine whether to apply the negative score.

14. A method for automatically providing suggestions for email recipients to a user composing an email, the user having first and second email accounts individually containing a plurality of contacts with associated contact data containing frequencies of communications between the user and the individual contacts, the method comprising:

when the user is composing an email,
 receiving a selection of one of the first or second email account to be used to send the composed email;
 determining which one of the first or second email account is selected by the user to send the composed email;
 deriving suggestions of additional email recipients for the email being composed based on (i) the determined one of the first or second email account selected to send the composed email and (ii) the frequencies of communications between the user and the individual contact contained in the contact data obtained from both the first and second email accounts;
 providing the derived suggestions of additional email recipients for selection by the user;
 receiving another selection of one of the provided suggestions of the additional email recipients; and
 in response to the received another selection, designating the selected one of the provided suggestions of the additional email recipients as a recipient for the email being composed.

15. The method of claim 14, further comprising:

receiving a first subset of the contact data from a first device that the user uses to compose the email; and receiving a second subset of the contact data from a second device, the received second subset being different than the received first subset of the contact data.

16. The method of claim 15 wherein the method further comprises:

when user is composing the email,
 determining whether the first or second device is being used to send the composed email; and
 wherein deriving suggestions of the additional email recipients includes deriving suggestions of the additional email recipients for the email being composed based on (i) the determined one of the registered email accounts to be used to send the composed email and (ii) the frequencies of communications between the user and the individual contact contained in the received contact data obtained from across all of the at least two of the plurality of email accounts, and (iii) the determination of whether the first or second device is being used to send the composed email.

17. A computing system for automatically providing suggestions for email recipients to a user composing an email, the user having first and second email accounts individually containing a plurality of contacts with associated contact data containing frequencies of communications between the user and the individual contacts, the computing system comprising:

a processor; and a memory containing instructions executable by the processor to cause the processor to perform a process comprising:

receiving a selection of one of the first or second email account to be used to send an email;

determining which one of the first or second email account is selected by the user to send the composed email;

deriving suggestions of additional email recipients for the email being composed based on (i) the determined one of the first or second email account selected to send the composed email and (ii) the frequencies of communications between the user and the individual contact contained in the contact data obtained from both the first and second email accounts;

providing the derived suggestions of additional email recipients for selection by the user;

receiving another selection of one of the provided suggestions of the additional email recipients; and in response to the received another selection, designating the selected one of the provided suggestions of the additional email recipients as a recipient for the email being composed.

18. The computing system of claim 17 wherein the process performed by the process further includes:

receiving a first subset of the contact data from a first device that the user uses to compose the email; and receiving a second subset of the contact data from a second device, the received second subset being different than the received first subset of the contact data.

19. The computing system of claim 18 wherein the process performed by the process further includes:

determining whether the first or second device is being used to send the composed email; and wherein deriving suggestions of the additional email recipients includes deriving suggestions of the additional email recipients for the email being composed based on (i) the determined one of the registered email accounts to be used to send the composed email and (ii) the frequencies of communications between the user and the individual contact contained in the received contact data obtained from across all of the at least two of the plurality of email accounts, and (iii) the determination of whether the first or second device is being used to send the composed email.

\* \* \* \* \*